United States Patent [19]

Komachi

[11] Patent Number: 4,611,496
[45] Date of Patent: Sep. 16, 1986

[54] ULTRASONIC FLOW METER
[75] Inventor: Taichi Komachi, Tokyo, Japan
[73] Assignee: Tokyo Keiki Co., Ltd., Tokyo, Japan
[21] Appl. No.: 632,045
[22] Filed: Jul. 18, 1984
[30] Foreign Application Priority Data Jul. 27, 1983 [JP] Japan .................................. 58-137011
Jul. 27, 1983 [JP] Japan .................................. 58-137012

[51] Int. Cl.$^4$ .............................................. G01F 1/66
[52] U.S. Cl. .................................................. 73/861.27
[58] Field of Search ............ 73/861.27, 861.28, 861.26

[56] References Cited

U.S. PATENT DOCUMENTS 2,921,467 1/1960 Hedrich et al. .................. 73/861.27
4,372,167 2/1983 Loveland .......................... 73/861.28

FOREIGN PATENT DOCUMENTS 2099146 12/1982 United Kingdom ............ 73/861.27

Primary Examiner—Charles A. Ruehl
Attorney, Agent, or Firm—Birch, Stewart, Kolasch and Birch

[57] ABSTRACT

In an ultrasonic flow meter in which an ultrasonic transducer for transmission and an ultrasonic transducer for reception are arranged so as not to be opposite to each other, so that the flow rate is measured from the flow rate dependency of the phase difference of the ultrasonic wave in the fluid and the distance between said ultrasonic transducers, (1) the ultrasonic flow meter being provided with an oscillator wherein the frequency of the ultrasonic wave is controlled in correspondence with said phase difference in order to make it possible to measure when the phase difference is not smaller than $0-\pi$, and (2) the ultrasonic flow meter also being provided with an electric circuit to compensate the measurement error due to the variance of the acoustic velocity of the ultrasonic wave in the fluid.

4 Claims, 8 Drawing Figures

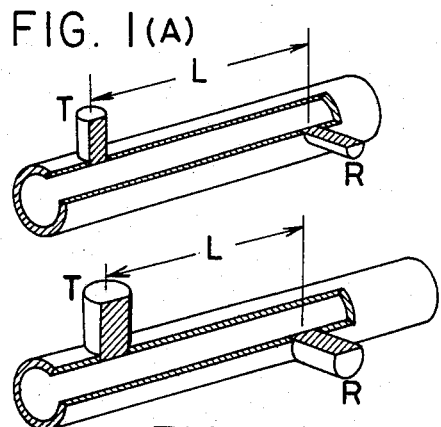
FIG. 1(A)
FIG. 1(B)
FIG. 1(C)
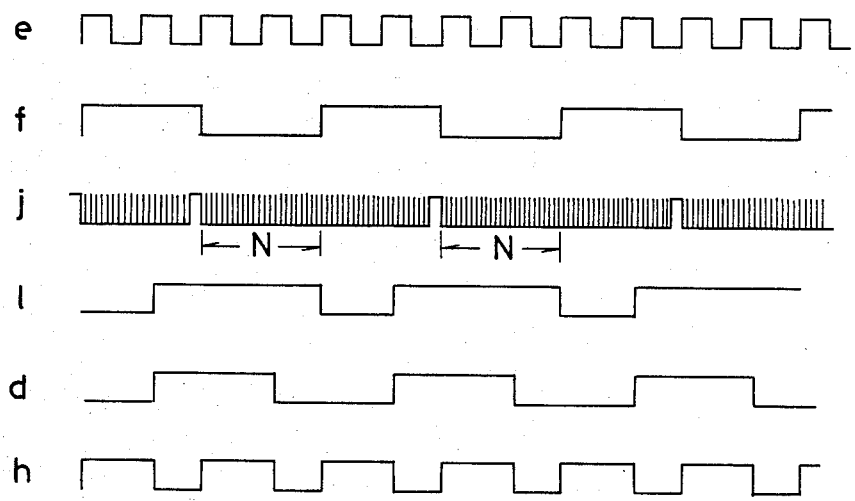
FIG. 3

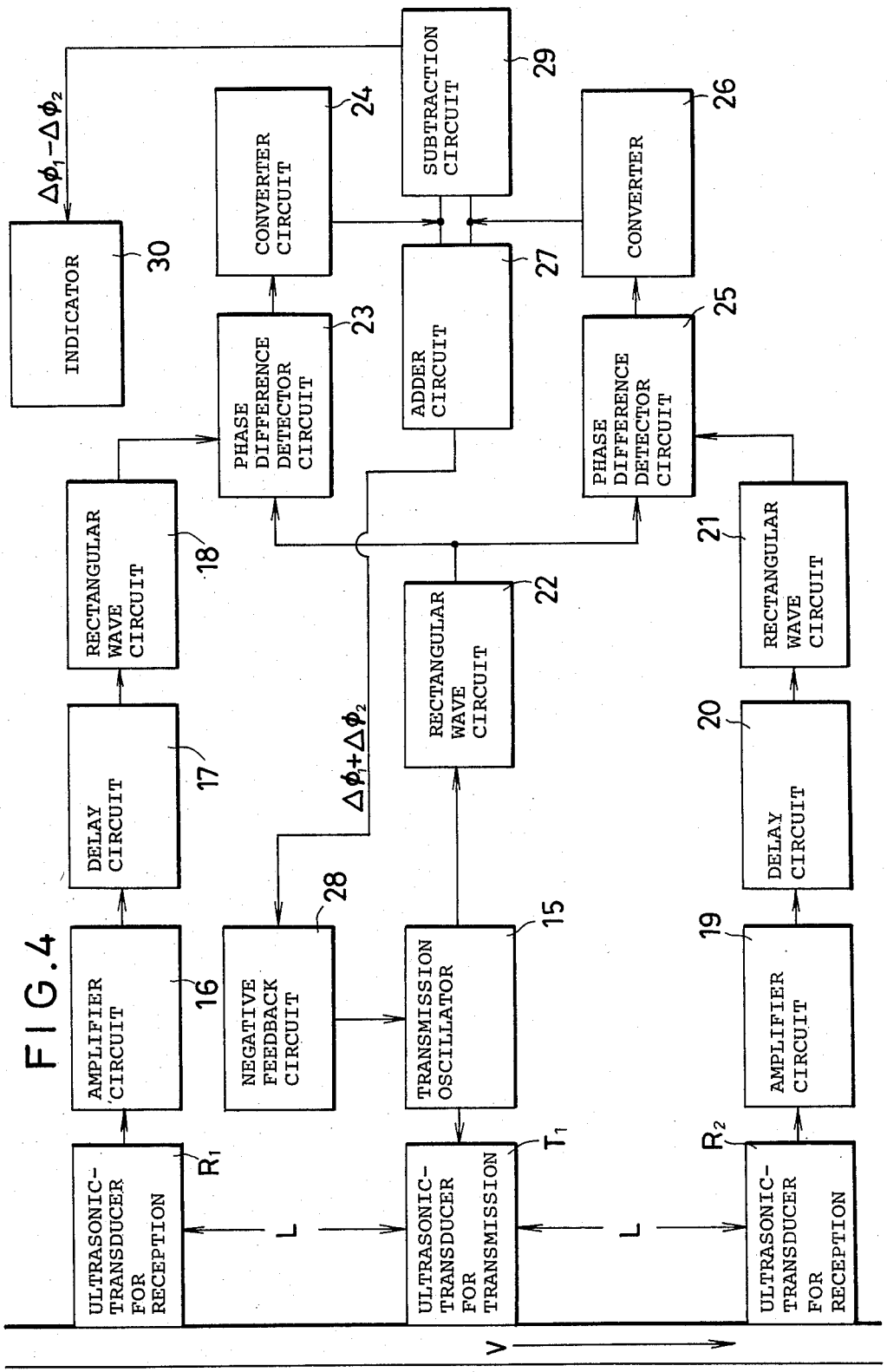

ULTRASONIC FLOW METER

BACKGROUND

The present invention relates to an ultrasonic flow meter. In particular, the invention relates to a flow meter using continuous ultrasonic waves.

Flow meters using ultrasonic waves can be classified into two types. That is, one is the flow meter of the ultrasonic pulse system and the other is the flow meter of the continuous ultrasonic wave system.

In a conventional flow meter using ultrasonic pulses, the ultrasonic pulse beam is transmitted into the fluid so that the flow rate is obtained from the propagation time of the pulse in the fluid. In this case, there was a drawback. That is, since the flow rate is measured from the time difference of the pulses, which becomes short when the flow rate is small, it was required that the clock frequency be high (to the limit of IC at present). Thus it was difficult to enlarge and measure small time differences.

In a flow meter using continuous ultrasonic waves, the ultrasonic beam is transmitted into the fluid from the ultrasonic transducer for transmission directly to the ultrasonic transducer for reception provided at another position in the fluid, and the flow rate of the fluid is obtained from the phase difference or another quantity depending on the flow rate.

In the conventional ultrasonic flow meter of either one of the above mentioned types, the ultrasonic wave was transmitted and received as a beam. It was required that the ultrasonic transmitter and the ultrasonic receiver are to be opposite to each other in order that the ultrasonic wave beam is mutually transmitted and received; it was possible to measure the flow rate only at the straight portion of the tube in which the fluid flows.

To improve the accuracy in measurement by making the phase difference or the time difference large, it is preferable that the angle $\theta$ between the ultrasonic beam and the axis of the tube should be made small to make the time difference long, in other words, the beam is made parallel to the axis of the tube. Since it was also required that the ultrasonic transmitter be opposite to the ultrasonic receiver, the degree of design freedom was limited.

In addition, in order to make the ultrasonic beam sharp, the frequency should be high. When the frequency becomes high, the short range acoustic field $AF$ ($=D^2/4\lambda$, wherein D is the diameter of the ultrasonic transducer and $\lambda$ is the wave length) becomes larger; the length 1 between the transmitter and the receiver becomes comparable with the short range acoustic field and the side lobe becomes larger, particularly when the diameter of the tube is small. In other words, not only the waves propagated along the straight line connecting the transmitter and the receiver, but also the waves which have propagated in various directions, are received, which increases the beam width and makes it difficult to measure the time difference correctly. These drawbacks were present in the continuous ultrasonic flow meter using the ultrasonic beam in accordance with the piror art.

In order to overcome the above mentioned drawbacks, the present inventor has invented a flow meter using a continuous ultrasonic wave which is not in the form of an ultrasonic beam. The ultrasonic wave is a standing wave in the cross section of the tube and a propagating wave in the axial direction of the tube. It is characteristic that the ultrasonic transducer for transmission and the ultrasonic transducer for reception are arranged on the wall of the tube so as not to be opposite to each other.

The degree of freedom is high in mounting the ultrasonic transducers in this ultrasonic flow meter. It is also possible to measure without disturbing the flow in the tube, because it is possible to mount the ultrasonic transducers on the outside of the wall of the tube. In addition, since it is not necessary to provide any member for causing a vortex as in the Kármán vortex flow meter, it is possible to make the pressure loss zero due to the member for causing vortex.

The principle of the measurement of the flow meter in accordance with the present invention is as follows: The ultrasonic wave does not propagate in a form of the ultrasonic beam but propagates as a standing wave in the tube. The propagation of the ultrasonic wave in the fluid follows the wave equation. Since the ultrasonic wave in tube has the limited boundary, the solution of to the equation is different from that in free space, so that the group velocity (acoustic velocity) C of the ultrasonic wave is different from that in free space. The solution to this equation is obtained by a mathematical method which is the same as that for a microwave waveguide.

When the tube has the cross section in the x, y planes and the ultrasonic wave propagates in the z direction, a solution of the wave equation is a standing wave in the x, y planes, being a propagating wave in the z direction. With respect this solution, the group velocity C of the ultrasonic wave, which is a function of the frequency f of the ultrasonic wave, is expressed as follows: wherein $f_c$ is the cut-off frequency.

$$C = K\sqrt{1 - (f_c/f)^2} \quad K: \text{constant}$$

And the following formula stands.

$$T_v = L/(C+V)$$

where L is the distance between the ultrasonic transmitter and the ultrasonic receiver, C is the group velocity of the ultrasonic wave in the fluid, V is the relative velocity of the fluid and the ultrasonic transmitter and $T_v$ is the time necessary for the propagation from the ultrasonic transmitter to the ultrasonic receiver. Therefore, the difference $\Delta T$ between the propagation times at $V=0$ and at $V \neq 0$ is expressed as follows.

$$\Delta T = L/C - L/(C+V)$$

The above expression is Taylor-expanded, so as to obtain the following expression.

$$\Delta T = \frac{L}{C}\left(\frac{V}{C} - \frac{1}{2}\frac{V^2}{C^2}\right)$$

In case $V<<C$, $\Delta T$ is proportional to V, $\Delta T = LV/C^2$. Thus, it is possible to obtain the flow rate V from $\Delta T$, C and l.

It is to be noted that the time difference $\Delta T$ may be obtained from the phase difference of the ultrasonic waves. Suppose the frequency of the ultrasonic wave is f, the phase difference $\phi$ which corresponds to the time difference $\Delta T$ satisfies the following relationship.

$$\cos \phi = \cos 2\pi f \Delta T$$

When $0 \leq \phi \leq \pi$, the following expression stands.

$$\phi = 2\pi f \Delta T = 2\pi f L V / C^2$$

Thus it is possible to obtain the flow rate V by detecting the phase difference $\phi$.

In obtaining the flow rate V from the time difference $\Delta T$, the group velocity (acoustic velocity) C and the distance L, the measurement has the following difficulties.

(i) In obtaining the flow rate V from the phase difference $\Delta \phi$, the available phase difference range is $0 - \pi$. Therefore, it is impossible to enlarge the range of the measurable flow rate.

(ii) The variance of the acoustic velocity in the fluid is a cause of error in measuring the flow rate, since the acoustic velocity C of the ultrasonic wave in the fluid depends upon the temperature of the fluid.

SUMMARY OF THE DISCLOSURE

Thus it is the first object of the present invention to provide an ultrasonic flow meter provided with a phase difference detector circuit which is able to freely enlarge the range of the measurable phase difference in order to make it possible to use the meter even if the phase difference is larger than one period of ultrasound.

It is the second object of the present invention to provide an ultrasonic flow meter wherein the ultrasonic frequency f is varied in correspondence with the variance of the acoustic velocity in the fluid so as to compensate for the above mentioned temperature dependence.

Additional objects and advantages of the invention will be best understood from the following description of preferred embodiments when read in connection with the accompanying drawings. The following embodiments are presented for illustrative purposes only and not for a limitative purpose. Various modifications can be made by those skilled in the art without departing from the spirit and scope of the present invention.

BRIEF DESCRIPTION OF THE DRAWINGS

FIGS. 1(A), 1(B) and 1(C) are perspective views, partially in cross section, showing exemplary arrangements of an ultrasonic flow meter in accordance with the present invention.

FIG. 1(A) shows the case wherein an ultrasonic transmitter T and an ultrasonic receiver R are provided so as not to be opposite to each other, with a distance L between them.

FIG. 1(B) shows the case wherein the ultrasonic transmitter T and the ultrasonic receiver R are provided outside the wall of the tube and FIG. 1(C) shows the case wherein the tube is bent and the ultrasonic transmitter T and the ultrasonic receiver R are arranged thereon so as not to be opposite to each other;

FIG. 3 shows timing charts of electric signals (e)–(h) in the circuit which is shown in FIG. 2;

FIG. 4 is a block diagram showing a preferred embodiment of an ultrasonic flow meter in compliance with the second object of the present invention; FIG. 5(A) is the view showing the variance of the measured values of the water temperature (dotted line) and the flow rate (solid line) with the passage of time (t) when the fluid of a constant flow rate V is measured without the temperature compensation in accordance with the present invention. FIG. 5(B) is the view showing the variance of the measured values of the water temperature (dotted line) and the flow rate (solid line) with the passage of time (t) under the same condition with the temperature compensation in accordance with the present invention.

DETAILED DESCRIPTION OF THE PREFERRED EMBODIMENTS

First, an explanation will be given with respect to the ultrasonic flow meter in compliance with the first object of the present invention: the ultrasonic flow meter provided with a phase difference detector circuit which makes it possible to measure even if the phase difference is larger than one period, detecting the time difference $\Delta T$ as the phase difference $\Delta \phi$ with the ultrasonic transducer arrangements shown in FIGS. 1(A), 1(B), and 1(C).

For obtaining the time difference $\Delta T$ from the phase difference $\Delta \phi$, the sine-wave signal generated in the continuous oscillator is sent to the ultrasonic transmitter T to generate the ultrasonic wave. At the same time, one portion thereof is sent directly to a converter circuit (for example, a comparator) to convert it into a square wave (which will be referred to as "reference signal"). The ultrasonic wave propagated in the fluid is again converted into an electric signal by means of the ultrasonic receiver R and amplified at an amplifier to convert it to a square wave (which will be referred to as "reception wave") at another converter circuit (for example, a comparator). The phase difference of the above mentioned reference wave and reception wave is detected at the phase difference detector circuit.

In accordance with the phase difference detector circuit, both the transmission signal and the reception signal are subjected to a frequency division with the same ratio, and are supplied to the phase difference detector circuit (for example, an exclusive "OR" circuit), thereby making it possible to obtain the time delay of the reception signal even if the time delay is larger than one period of the transmission wave.

Figure 2:
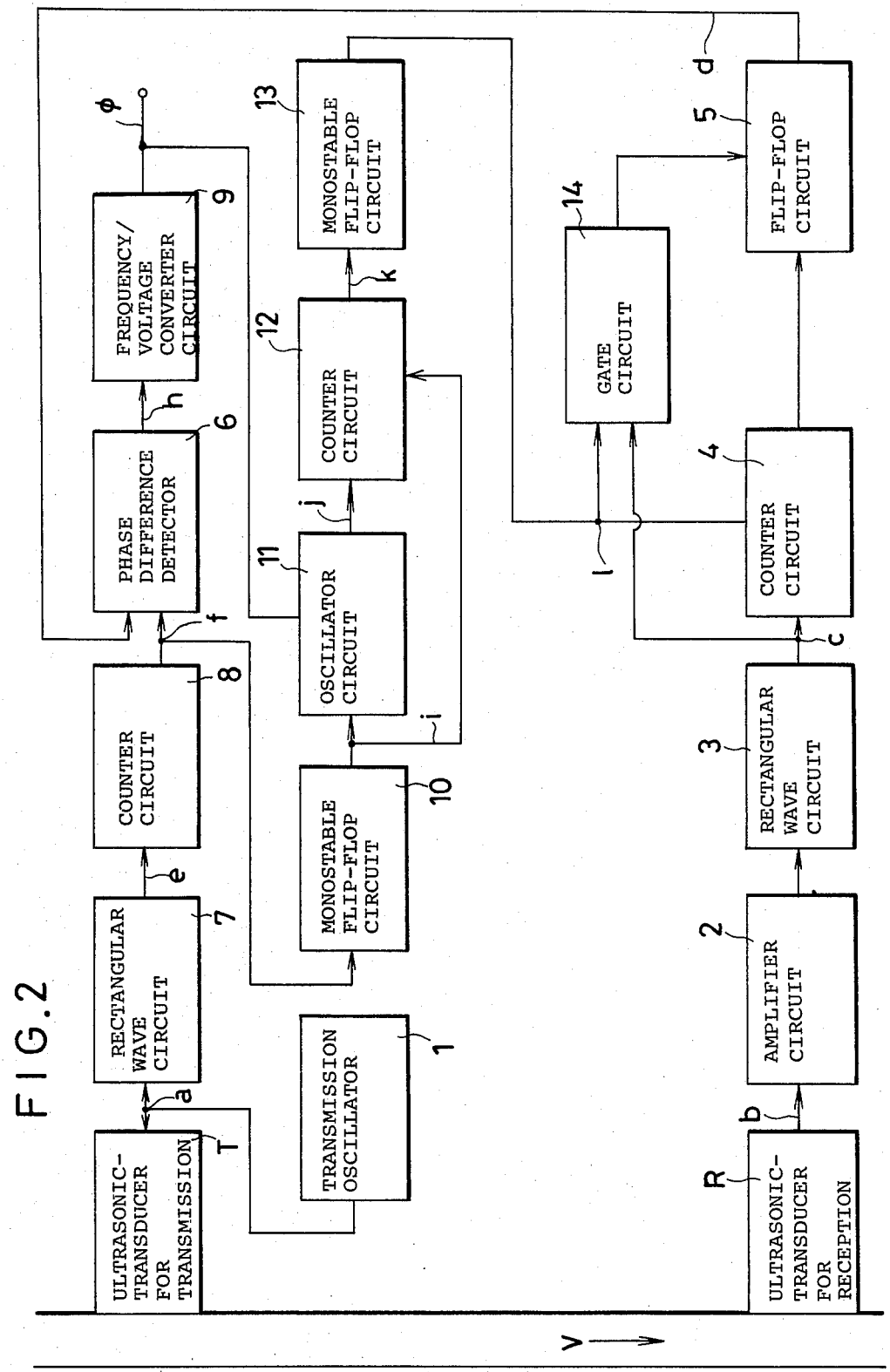
FIG. 2 is a block diagram showing one embodiment of an ultrasonic flow meter in compliance with the first object of the present invention.

The ultrasonic flow meter in compliance with the first object of the present invention will be described with reference to FIG. 2 and FIG. 3.

An ultrasonic wave is transmitted into the fluid of a flow rate V from the ultrasonic transducer T for transmission according to the output signal (a) of an transmission oscillator 1. The ultrasonic wave propagated in the fluid is converted into an electric signal (b) at the ultrasonic transducer R for reception and amplified at an amplifier circuit 2 to convert into a rectangular wave (c) at a rectangular wave circuit 3. The rectangular wave (c) is subjected to a frequency division at a counter circuit 4 and a flip-flop circuit 5 so that its period may be made long and then supplied as one input signal (d) to a phase difference detector circuit 6. On the other hand, one portion of the output signal (a) of the transmission oscillator 1 is converted into a signal (e) of a rectangular wave form at a rectangular wave circuit 7 and subjected to a frequency division at a counter circuit 8 so as to generate a signal (f) whose period is made long. And this signal (f) is supplied as the other input signal to the phase difference detector circuit 6. The ratio of the frequency division at the counter circuit 8 is the same as the product of the ratios of the frequency divisions respectively at the counter circuit 4 and the flip-flop circuit 5. Therefore, in case the signal (a) and the signal (b) have the same period, the signal (f) and the signal (d) have the same period. The phase difference of the signal (f) and the signal (d) is detected at the phase difference detector circuit 6 which is, for example, an exclusive OR circuit. Its output signal (h) is converted into an analog signal $\phi$ by a frequency/voltage converter circuit 9 which may be, for example, a low-pass filter circuit or the like. And the flow rate V is obtained from $\phi$.

The above mentioned counter circuit 4 and flip-flop circuit 5 are reset as follows. The output signal (f) of the counter circuit 8 branches so as to trigger a monostable flip-flop circuit 10, thereby generating a one-shot pulse signal (i). This signal (i) is sent to the oscillation control terminal of an oscillator circuit 11 which oscillates with the frequency which is in proportion to the inverse number of the above mentioned signal $\phi$, so that the oscillator circuit 11 generates an oscillation signal (j) during a period of time which is determined by the monostable flip-flop circuit 10 from the fall of the signal (f). This signal (j) is counted by means of a counter circuit 12. An output signal (k) from the counter circuit 12, which is generated at every pulse of a predetermined number N (for example, N=32), triggers a monostable flip-flop circuit 13 for gating so as to generate a one-shot pulse signal l. The counter circuit 12 is reset at the starting end of the one-shot pulse signal (i). Thus, the starting end of the one-shot pulse signal l is delayed by a time which is in proportion to the signal $\phi$ with respect to the starting end of the signal (i). The signal l resets the counter circuit 4. In addition, the signal l branches so as to reset the flip-flop circuit 5 by way of a gate circuit 14. The gate circuit 14 is for example, an AND circuit being supplied with the signal (c) of a rectangular wave and the signal l.

Since the phase difference detector circuit in accordance with the present invention is constituted as mentioned above, it is possible to obtain the flow rate V as an analog signal $\phi$ even if the phase difference is larger than one period. Now, this will be explained more precisely with reference to FIG. 2 and FIG. 3.

The rectangular wave (e) which is obtained from the output signal (a) of the transmission oscillator 1 is subjected to a frequency division at the counter circuit 8 so to make the signal (f). There is shown the example of the signal (f) wherein the frequency division ratio is 1/4 in the FIG. 3. In this case, it is possible to detect the phase difference corresponding to two periods with respect to the signal (a) or the signal (e). The one-shot pulse (i) with long pulse length is excited at the rise end of the signal (f), and at the same time, the oscillator circuit 11 starts to oscillate. Since the oscillation frequency of the oscillator circuit 11 is in proportion to the inverse number of the signal $\phi$, the time necessary to count pulses up to N is in proportion to the signal $\phi$. The signal l is triggered and said signal l resets the counter circuit 4 when the pulses are counted up to N, so that the count-starting time of the counter circuit 4 is delayed from that of the counter circuit 8 by the time which is in proportion to the signal $\phi$. The product of ratios of the frequency divisions at the counter circuit 4 and the flip-flop circuit 5 is equal to the ratio of the frequency division (1/4 in the example) at the counter circuit 8.

The signal (a) is subjected to a frequency division at the counter circuit 8 and the signal (b) is subjected to a frequency division at the counter circuit 4 and the flip-flop circuit 5 respectively with the same ratio. In addition, the synchronization is given by providing a time difference proportional to the signal $\phi$ at the count-starting end thereof, so that the phase relationship of the signal (d) and the signal (f) corresponds to that of the signal (a) and the signal (b). In other words, the signal $\phi$ is in proportion to the phase difference of the signal (a) and the signal (b). Since the synchronization is given and the signals are subjected to the frequency division as mentioned above, the signal $\phi$ varies following the flow rate V.

As the phase difference of the signal (a) and the signal (b) is in proportion to the flow rate V, it is possible to obtain the flow rate V from the phase difference.

Thus the ultrasonic flow meter in accordance with the present invention is provided with the phase difference detector circuit as mentioned above, and there is an advantage that the measurable range of the flow rate is enlarged and the distance between both the ultrasonic transducers can be decided freely. In addition, the measured value is stable due to the memory effect of the flip-flop circuit. In other words, the measured value does not vary at once even if the ultrasonic reception signal disappears by some reason.

Now, an explanation will be given with respect to an ultrasonic flow meter in compliance with the second object of the present invention. The meter is provided with an electric circuit to compensate for the temperature dependence of the group velocity (acoustic velocity) of the ultrasonic wave in the fluid.

The ultrasonic transducer for transmission and the ultrasonic transducer for reception are provided at the wall of the tube in which the fluid flows so as not to be opposite to each other in this ultrasonic flow meter. A continuous ultrasonic wave is transmitted from the ultrasonic transducer for transmission according to the oscillation signal from the ultrasonic oscillator. The ultrasonic wave propagated in the fluid is detected by the ultrasonic transducer for reception and converted into an electric signal. And the phase difference $\Delta\phi$ of the output signal is given by the phase difference detector circuit to obtain the flow rate.

The phase difference $\phi$ between the output signals of both the ultrasonic transducers may be obtained by the following formula (1).

$$\phi = \frac{2\pi f \cdot L}{C + V} \quad (1)$$

where f is the frequency of the ultrasonic wave, L is the distance between both the ultrasonic transducers, C is the group velocity of the ultrasonic wave and V is the flow rate.

In case V/C is small, the formula (1) is expanded as shown in the following formula (2).

$$\phi = \frac{2\pi fL}{C}\left(1 - \frac{V}{C}\right) \qquad (2)$$

Suppose the value of $\phi$ in the formula (2) is $\phi_1$ in the case where the propagation direction is along the flow, and the value of $\phi$ is $\phi_2$ in the case where the propagation direction is against the flow, the difference thereof is given as shown in the following expression (3)

$$\phi_2 - \phi_1 = \frac{4\pi fLV}{C^2} \qquad (3)$$

Although it is possible to obtain the flow rate V from the formula (3), the acoustic velocity C in the formula (3) depends upon the temperature, which is one of the causes of measurement error.

In order to compensate for the temperature dependency of the acoustic velocity, the present inventor has proposed an ultrasonic flow meter in which the frequency is controlled in correspondence with the acoustic velocity C so that $f/C^2$ may become constant. In that case, however, it was required to provide a microcomputer for the above mentioned control. As a consequence, there was a problem in that the ultrasonic flow meter was complicated and the cost thereof was high.

In accordance with the present invention, ½ of the sum $\phi_1+\phi_2$ of the phase differences $\phi_1$, $\phi_2$ is kept so as to be equal to $\pi/2$, thereby providing a solution of the problem.

The function of the ultrasonic flow meter in compliance with the second object of the present invention wherein the temperature dependence of the acoustic velocity is compensated will be described with reference to FIG. 4.

An output of a transmission oscillator 15 is supplied to an ultrasonic transducer $T_1$ for transmission. The ultrasonic wave is transmitted from the transducer $T_1$ into a fluid of the flow rate V to be received by ultrasonic transducers $R_1$ and $R_2$ for reception. The output of the transducer $R_1$ is transferred via an amplifier circuit 16 and a delay circuit 17 to a rectangular wave circuit 18, to be converted into a rectangular wave. The output of the transducer $R_2$ is likewise transferred via an amplifier circuit 19 and a delay circuit 20 to a rectangular wave circuit 21, to be converted into a rectangular wave. In addition, one portion of the output of said transmission oscillator 15 is also converted into a rectangular wave at a rectangular wave circuit 22.

The phase difference of the outputs of the rectangular wave circuits 18 and 22 is detected by a phase difference detector circuit 23 (for example, an exclusive OR circuit) and a voltage signal $\phi_1$ which is in proportion to the above phase difference with the same reference symbol is obtained by a converter circuit 24 (for example, a CR smoothing circuit). And a voltage signal $\phi_2$ which is in proportion to the phase difference with the same reference symbol of the outputs of the rectangular wave circuits 21 and 22 is likewise obtained by a phase difference detector circuit 25 and a converter circuit 26.

The said signals $\phi_1$ and $\phi_2$ are supplied as inputs to an adding circuit 27 so as to obtain a sum signal $(\phi_1+\phi_2)/2$. The frequency of the transmission oscillator 15 is controlled via a negative feed-back circuit 28 so that $(\phi_1+\phi_2)/2$ may be a constant value. It is preferable that the above constant value is $\pi/2$ in view of the measurable range. On the other hand, the signals $\phi_1$ and $\phi_2$ are also supplied as inputs to a subtraction circuit 29. Since the output $(\phi_1-\phi_2)$ thereof is in proportion to the flow rate, the output $(\phi_1-\phi_2)$ is indicated by an indicator 30, so that the flow rate is indicated. The flow rate which is obtained from $(\phi_1-\phi_2)$ is independent of the acoustic velocity by the control of the frequency as mentioned above.

It is also possible that the roles of the ultrasonic transducer for transmission and the ultrasonic transducer for reception are reversed by a transmission and reception switching circuit (not shown).

The flow rate obtained from $(\phi_1-\phi_2)$ is not dependent upon the temperature variance of the acoustic velocity.

Suppose the angular frequency of the oscillator is $\omega$, the distance between the transducer T for transmission and the transducer R for reception is L, the flow rate is V, the acoustic velocity in the fluid is C and the delay time in the delay circuit is chosen to be a proper value, the voltages $\phi_1$ and $\phi_2$ being proportional to the corresponding phase differences can be expressed by the following formulae (4) and (5), neglecting the scale factors.

$$\phi_1 = \frac{\omega L}{C - V} + \frac{\pi}{2} \qquad (4)$$

$$\phi_2 = \frac{\omega L}{C + V} + \frac{\pi}{2} \qquad (5)$$

The flow rate V is obtained from the difference $\phi$ of the formula (4) and (5).

$$\phi = \phi_1 - \phi_2 = \omega L\left(\frac{1}{C-V} - \frac{1}{C+V}\right) \approx \frac{2\omega LV}{C^2} \qquad (6)$$

In case the acoustic velocity C in the formula (6) has the temperature (T) dependence, the measured result may have the temperature dependence. In order to compensate for this temperature dependence, it has been considered to vary the frequency $\omega$. The condition of $\omega$ such that $\phi$ does not have a temperature dependence is given as follows.

$$\frac{d\phi}{dT} = \frac{\partial\phi}{\partial C}\frac{\partial C}{\partial T} + \frac{\partial\phi}{\partial \omega}\frac{\partial \omega}{\partial T} = 0 \qquad (7)$$

Substituting the formula (6) into the formula (7), the following formula (8) is obtained.

$$\frac{2}{C(1-V^2/C^2)}\frac{\partial C}{\partial T} = \frac{1}{\omega}\frac{\partial \omega}{\partial T} \qquad (8)$$

In case $V<<C$, the formula (8) becomes the following formula (9).

$$\frac{2}{C}\frac{\partial C}{\partial T} = \frac{1}{\omega}\frac{\partial \omega}{\partial T} \qquad (9)$$

Therefore, if the frequency $\omega$ is changed in accordance with the formula (10), $\phi$ in the expression (6) does not have the temperature dependency.

$$2\frac{\Delta C}{C} = \frac{\Delta \omega}{\omega} \qquad (10)$$

In order to control the frequency in accordance with the expression (10), information as to the acoustic velocity C and the frequency $\omega$ is necessary; a suitable sensor or microprocessor is required.

In accordance with the ultrasonic flow meter of the present invention, the same object is performed by keeping $\phi_1+\phi_2$ to be a constant value.

In case $V<<C$, the following expression (11) is obtained from the expression (4) and (5).

$$\frac{\phi_1+\phi_2}{2} = \frac{\omega L}{C} + \frac{\pi}{2} \quad (11)$$

Substituting $\omega^0+\Delta\omega$ for $\omega$ and $C_0+\Delta C$ for C in, the expression (11), it can be transformed into the expression (12).

$$= L(\omega_0+\Delta\omega)\frac{1}{C_0+\Delta C} + \frac{\pi}{2} \quad (12)$$

$$= L\frac{(\omega_0+\Delta\omega)}{(C_0+\Delta C)} + \frac{\pi}{2}$$

$$= \frac{L\omega_0}{C_0}\left(1+\frac{\Delta\omega}{\omega_0}\right)\left(1-\frac{\Delta C}{C_0}\right) + \frac{\pi}{2}$$

In this case, since the $\Delta C/C_0$ is a small value, $(\phi_1+\phi_2)/2$ practically becomes constant by keeping the following expression (13). The formula (13) stands by keeping $(\phi_1+\phi_2)/2$ so as to be $\pi/2$ in the range for practical use.

$$\Delta\omega/\omega_0 = \Delta C/C_0 \quad (13)$$

The formula (13) and the formula (10) are of the same form of function neglecting the constant factor. Thus to keep $(\phi_1+\phi_2)/2$ so as to be $\pi/2$ means that the frequency satisfies the relation in the formula (10) in the range for practical use accordingly.

As described hereinbefore, when the sum of the phase difference of the ultrasonic wave propagated along the flow and that of the ultrasonic wave propagated against the flow is kept constant, there is compensation for the temperature dependency of the acoustic velocity in the fluid. In other words, it is possible to substantially compensate for the temperature dependency of the acoustic velocity in the flow, without using any temperature sensor or microprocessors.

Figure 5A:
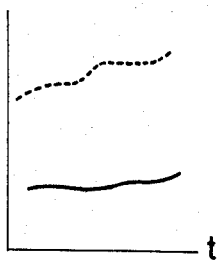
FIGS. 5(A) and 5(B) are views of experimental examples showing the case with temperature compensation in accordance with the present invention and the case without temperature compensation so that they are compared with each other.
Figure 5B:
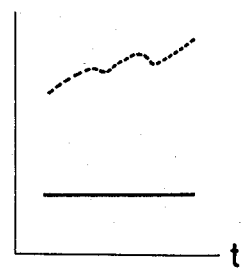

In general, when the water temperature fluctuates with time, the acoustic velocity (group velocity) in the water also fluctuates with time. In spite of this, there is shown in FIGS. 5(A) and 5(B) that the dependence on the water temperature fluctuation (the acoustic velocity variance) is not recognized in the measured flow rate by means of the ultrasonic flow meter in compliance with the second object of the present invention.

Although $\phi_1$ and $\phi_2$ are measured at the same time in the embodiments described above, it is also possible, to measure them alternately using a sample hold circuit and a transmission and reception switching circuit.

What is claimed is:

1. An ultrasonic flowmeter for measuring flow along a fluid flow path having a center thereof comprising:
   first ultrasonic transducer means for emitting an ultrasonic wave for transmission in the fluid flowing in the path;
   second ultrasonic transducer means for receiving said ultrasonic wave propagated in said fluid along the path and producing a reception signal indicative thereof, wherein a line drawn between said first and second transducer means does not cross directly through the center of said fluid flow path;
   transmission oscillator means for generating a drive signal to drive said first ultrasonic transducer means for transmission;
   first counter means for frequency dividing said drive signal generated by said transmission oscillator means;
   second counter means synchronized with said transmission oscillator for frequency dividing the reception signal received by said second ultrasonic transducer means to develop an output signal thereof;
   phase difference detection means for detecting the phase difference between the drive signal generated by said transmission oscillator means and the reception signal from said second ultrasonic transducer means and developing an output, wherein both the signals are synchronized and frequency divided by said first and second counter means with the said dividing ratio;
   frequency/voltage converter means for converting the output of said phase difference detection means into an analog signal corresponding to the flow rate of said fluid;
   an oscillator oscillating with a frequency proportional to said analog signal and producing an output;
   third counter means for counting the output of said oscillator up to a predetermined number;
   monostable flip-flop means, triggered by an output signal of said third counter means for resetting said second counter means.

2. The ultrasonic flowmeter of claim 1, further comprising monostable flip-flop means for driving said oscillator within a predetermined period after its triggering by the output signal of said first counter means.

3. An ultrasonic flowmeter for measuring flow along a fluid flow path having a center thereof comprising:
   first ultrasonic transducer means driven with a transmission oscillator for emitting an ultrasonic wave for transmission in the fluid flowing in the path;
   second ultrasonic transducer means for receiving said ultrasonic wave propagated in said fluid along the flow and producing a reception signal indicative thereof, wherein a line drawn between said first and second transducer means does not cross directly through the center of said fluid flow path;
   third ultrasonic transducer means for receiving said ultrasonic wave propagated in said fluid against the flow and producing a reception signal indicative thereof, wherein a line drawn between said first and third transducer means does not cross directly through the center of said fluid flow path;
   means for obtaining the phase difference between the ultrasonic wave propagated along the flow and a driving signal of said first ultrasonic transducer;
   means for obtaining the phase difference between the ultrasonic wave propagated against the flow and the driving signal of said first ultrasonic transducer;
   means for converting the sum of said two phase differences into a first analog signal;
   means for converting the difference of said two phase differences into a second analog signal;

signal feed-back means for controlling the frequency of the transmission oscillator so that the sum of said phase differences is a constant value; and indicator means for obtaining and indicating the flow rate from the difference of said phase differences.

4. The ultrasonic flowmeter of claim 3, in which said means for obtaining the phase difference is composed of an exclusive OR means and a smoothing circuit for smoothing the output of said exclusive OR means, wherein one input of the exclusive OR means is the output of a series connection of the transmission oscillator for driving said first ultrasonic transducer and a rectangular wave producing means.

* * * * *